UNITED STATES PATENT OFFICE.

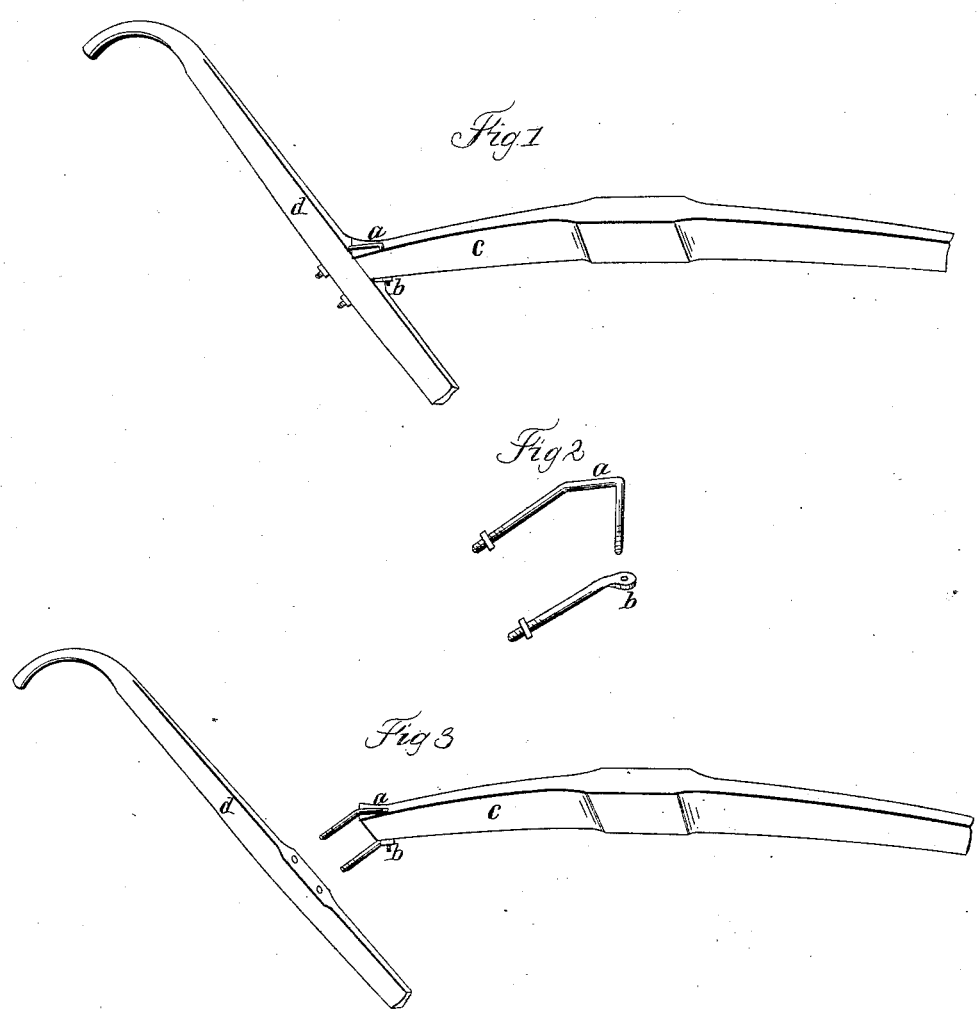

FREDERIC FOGELGESANG, OF CANTON, OHIO.

IMPROVEMENT IN PLOWS.

Specification forming part of Letters Patent No. 59,577, dated November 13, 1866.

*To all whom it may concern:*

Be it known that I, FREDERIC FOGELGESANG, of Canton, in the county of Stark, in the State of Ohio, have invented a new and Improved Mode of Fastening Plow-Handles to Beams; and I hereby declare that the following is a full and exact description thereof, reference being had to the accompanying drawings, and to the letters of reference and figures marked thereon.

My invention consists in providing the beam and handle, where they are to be joined, with two rods or bolts, joined by a screw in such a manner as to make them a continuous one, which, when bent and fitted on and through said beam and handle, may be tightly drawn by nuts and washers on the handle.

The advantages of this method are its simplicity and increased strength.

To enable others skilled in the art to make and use my invention, I will describe its construction and operation.

The beam and handle are fitted without tenon or mortise. Two holes of the size of the rods $a$ and $b$, Figure 2, are bored through the handle $d$, to correspond with the upper and lower sides of the beam $c$, and one in the beam $c$ about three and one-half inches from the end to which the handle $d$ is to be joined, and nearly square through from the upper side, so that the lower end of the hole shall nearly join the handle $d$ when attached to the beam $c$. The rod $a$, Fig. 2, threaded at both ends and bent so as to be received on and through the beam $c$, is then firmly fastened by screwing on rod $b$, as seen in Fig. 3. Thus constructed, the beam $c$ and rods $a$ and $b$ in Fig. 3 are ready to receive the handle $d$, and, finally, to be firmly fastened by nuts and washers on said rods, as seen in Fig. 1.

I do not claim the fastening of plow-handles to beams by the mere use of bolts, nor yet without the use of a tenon and mortise, as these have been in some form or another heretofore used; but What I do claim, and desire to secure by Letters Patent, is—

The employment of two rods so bent and joined at the under side of the beam by a screw as to make them a continuous bolt through the beam and handle, and firmly fastened by nuts and washers on the outside of said handle, as hereinbefore described.

FREDERIC FOGELGESANG.

Witnesses:
 GEO. W. RAFF,
 GEO. GIBBS.